July 16, 1935.   G. CARWARDINE   2,008,093

EQUIPOISING MECHANISM

Filed Sept. 14, 1934

Inventor:
George Carwardine,

Patented July 16, 1935

2,008,093

UNITED STATES PATENT OFFICE 2,008,093

EQUIPOISING MECHANISM

George Carwardine, Bath, England, assignor of one-half to Herbert Terry & Sons Limited, Redditch, England, a British company Application September 14, 1934, Serial No. 743,944
In Great Britain October 7, 1933

4 Claims. (Cl. 88—97)

This invention relates to improvements in connection with the mounting of mirrors, pictures, photographs, and the like, and has for its object the provision of equipoising mechanism whereby the mirror or the like can be readily tilted to any desired angle without liability to collapse due to disturbed equilibrium.

A mirror or the like can be supported on a table by providing it with a rear strut, but if this strut be hinged to permit of tilting at various angles, the mirror or the like will only remain stable in settings in which the angle between the strut and the vertical is less than the angle of friction between the strut and the table. A setting at any greater angle will overcome the friction and the support will collapse.

According to the present invention, in order to permit of the stability of a strutted mirror or the like in settings outside the angular limits referred to, a coiled tension spring is connected between the back of the mirror and an anchorage point on a poised lever pivotally connected to the back of the mirror in pressure cooperation with the strut, the poised lever being so disposed in relation to the strut as not to rotate in a vertical plane as the mirror tilts, and the spring being preferably characterized in that its tensional pull is proportionate to its length.

In order that the invention may be clearly understood and readily carried into practice, reference may be had by way of example to the accompanying drawing, in which:—

In the embodiment illustrated an attachment bracket $a$ and a strut $b$ are pivotally jointed together at $c$ so as to form an inverted V structure of which the legs from the joint downwards are of equal length. The bracket $a$, to which is attached the mirror $d$, is extended above the joint $c$, and to this extension is pivoted at $e$ a dependently poised lever $f$ having on its inner edge an intermediate recess $g$ forming an abutment for a peg or roller $h$ provided on the strut $b$ at a distance below the joint $c$ equal to the distance at which the poised lever $f$ is pivoted at $e$ above the joint $c$. A coiled tension spring $i$ is now connected at $j$ to the lower end of the bracket $a$ and anchored at $k$ to the lower end of the lever $f$, thereby serving to keep this lever $f$ poised in permanent pressure contact with the peg or roller $h$ on the strut.

The abutment recess $g$ is substantially straight and parallel to a line through the centres of the peg or roller $h$ and the pivot $e$, and is located between terminal stops $l$ and $m$, and since the pivot $e$ and the peg or roller $h$ are at equal distances from the joint $c$, it follows that the poised lever $f$ will not be displaced from its normal vertical setting whatever may be the relative angular dispositions of the bracket $a$ and strut $b$.

Figure 1:
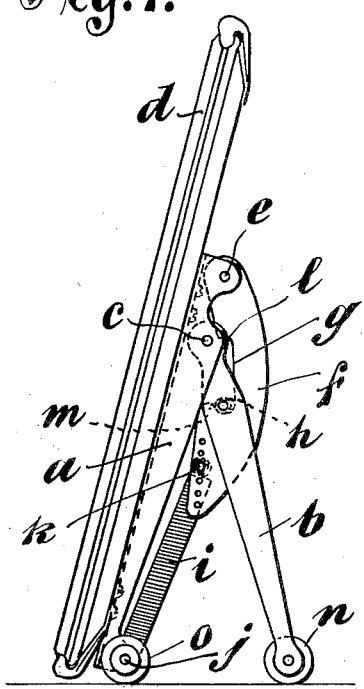
Figure 1 is a side elevation of a strutted mirror having the improvements applied, the mirror being shown in a high angular setting.
Figure 2:
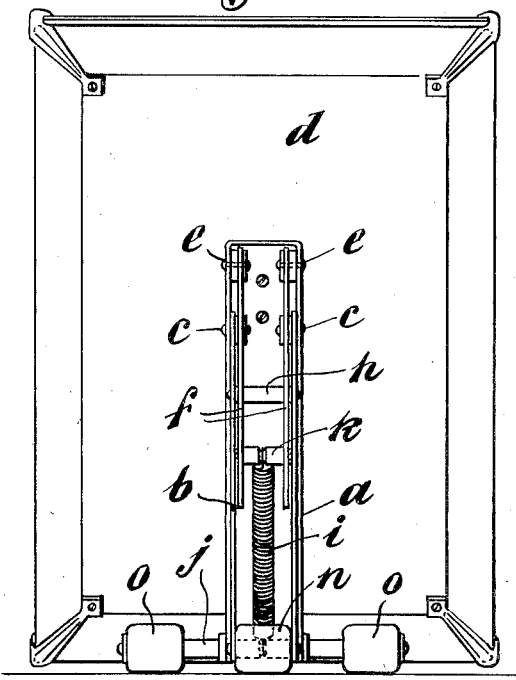
Figure 2 is a rear elevation of the mirror in the setting shown in Figure 1.
Figure 3:
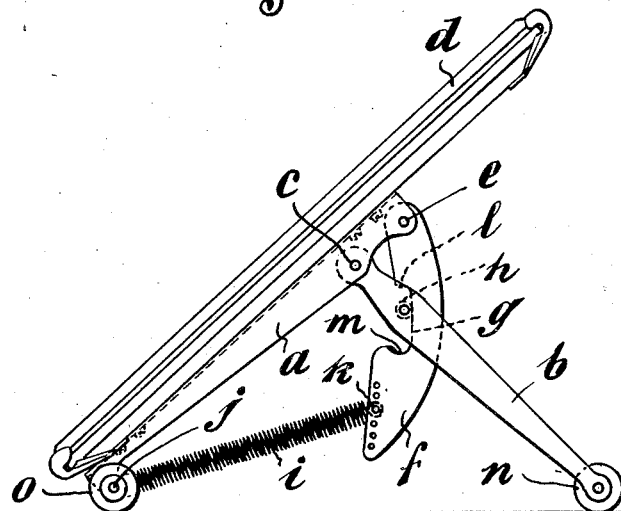
Figure 3 is a side elevational view corresponding to Figure 1 but showing the mirror in a lower angular setting.

The spring $i$ is connected between the bracket $a$ and poised lever $f$ in such a manner that when the mirror $d$ is upwardly tilted and the centre of gravity of the mounting and mirror approaches its highest point (Figure 1), then the line of force of the spring $i$ approaches a line passing through its lower point of connection $j$ and through the pivot $e$, this approach to an upper position of unstable equilibrium being limited by the stop $m$, and the approach to the lower setting being likewise limited by the stop $l$. The force of the spring $i$ is varied by adjusting its point of anchorage $k$ to the poised lever $f$.

The lower ends of the bracket $a$ and strut $b$ which contact with the table are rounded or are preferably fitted with rollers to facilitate horizontal displacement, the strut $b$ having for example a single roller $n$, and the bracket $a$ being provided with a spaced pair of rollers $o$ to ensure lateral stability.

The spring $i$ will generally be such as to have a large measure of pre-set strain, determined mainly according to the closed coil length of the spring, this having the effect that the force exerted by the spring is proportionate to its length and not to its measure of extension.

The lever $f$ can be arranged to be poised in a horizontal or other angular position by a suitable dispositon of its pivot $e$ in relation to the peg or roller $h$, always provided that the said pivot $e$ and the peg or roller $h$ are equidistant from the joint $c$.

It will moreover be appreciated that the invention can be applied in a variety of ways to serve many useful purposes in addition to the equipoising of mirrors and the like, such for example as in connection with artists' and scholastic easels, music and reading stands, and the like.

What I claim as my invention and desire to secure by Letters Patent is:

1. An equipoising mechanism for ensuring the stability of a strutted mirror, stand, or the like, in various angular settings, comprising a strut pivotally jointed to the back of the mirror, a poised lever pivoted to the back of the mirror above the pivotal joint for said strut, and a coiled tension spring connected between the back of the mirror and an anchorage point on said poised lever so as to hold the latter in pressure cooperation with said strut, said poised lever being so disposed relative to said strut as to retain its position while the mirror is tilted.

2. An equipoising mechanism as specified in claim 1, in which said spring is such that the force exerted by it is proportionate to its length.

3. An equipoising mechanism for ensuring the stability of a strutted mirror, stand, or the like in various angular settings, and which comprises a bracket attachable in an upright position to the back of the mirror or the like, a strut pivotally jointed to an upper part of said bracket, a peg or roller provided on said strut at a point below the pivotal joint for the strut, a poised lever pivoted to an upper extension of said bracket above the pivotal joint for the strut, and a coiled tension spring connected between the back of the mirror or the like and an anchorage point on said poised lever so as to hold the lever in pressure contact with the peg or roller on the strut, the peg or roller and the poised lever pivot being located at equal distances from the pivotal joint for the strut so that the poised lever will not rotate in a vertical plane as the mirror or the like is tilted.

4. An equipoising mechanism as specified in claim 3, in which said poised lever intermediate its ends is formed with a recess, the ends of said recess constituting stops adapted to engage said peg or roller thereby limiting the angular movements of said strut.

GEORGE CARWARDINE.